(12) United States Patent
Bowers

(10) Patent No.: US 7,934,579 B2
(45) Date of Patent: May 3, 2011

(54) SUSPENSION ASSEMBLIES HAVING RESILIENT MEMBER AND VEHICLES INCLUDING SAME

(75) Inventor: Lee N. Bowers, Springfield, OH (US)

(73) Assignee: Honda Motor Company, Ltd., Tokyo (JP)

( * ) Notice: Subject to any disclaimer, the term of this patent is extended or adjusted under 35 U.S.C. 154(b) by 293 days.

(21) Appl. No.: 11/969,721

(22) Filed: Jan. 4, 2008

(65) Prior Publication Data
US 2009/0174167 A1 Jul. 9, 2009

(51) Int. Cl.
*B60G 9/02* (2006.01)
(52) U.S. Cl. ........... 180/352; 280/124.116; 280/124.103
(58) Field of Classification Search ........... 280/124.116, 280/124.103, 124.11, 124.156, 124.164, 280/124.165, 124.168, 124.177; 180/352
See application file for complete search history.

(56) References Cited

U.S. PATENT DOCUMENTS

| | | | | |
|---|---|---|---|---|
| 2,182,248 A | * | 12/1939 | Chayne | 180/352 |
| 2,300,844 A | | 11/1942 | Olley | |
| 2,345,448 A | | 3/1944 | Best | |
| 2,569,168 A | * | 9/1951 | Hellwig | 267/192 |
| 2,582,775 A | * | 1/1952 | Giacosa | 267/190 |
| 2,705,139 A | * | 3/1955 | Nallinger | 267/255 |
| 2,740,622 A | * | 4/1956 | Hickman | 267/25 |
| 2,746,766 A | | 5/1956 | Nallinger | |
| 2,955,842 A | | 10/1960 | Stump | |
| 3,024,041 A | * | 3/1962 | Maruhn | 280/124.109 |
| 3,157,242 A | | 11/1964 | Kozicki | |
| 3,333,864 A | | 8/1967 | Allison et al. | |
| 3,638,963 A | * | 2/1972 | Van Leeuwen | 280/124.141 |
| 3,737,174 A | * | 6/1973 | Hickman | 280/124.177 |
| 3,901,494 A | * | 8/1975 | Sena | 267/289 |
| 3,966,223 A | | 6/1976 | Carr | |
| 4,053,171 A | | 10/1977 | Hyler | |
| 4,116,298 A | | 9/1978 | Hyler | |
| 4,341,397 A | | 7/1982 | Morimura et al. | |
| 4,560,027 A | * | 12/1985 | Murakami et al. | 180/312 |
| 4,795,010 A | | 1/1989 | Kaneko | |
| 4,881,752 A | | 11/1989 | Tanaka | |
| 5,186,485 A | | 2/1993 | Orr et al. | |
| 5,203,585 A | * | 4/1993 | Pierce | 280/124.116 |
| 5,286,052 A | | 2/1994 | Lukianov | |
| 5,338,012 A | | 8/1994 | Kranick | |
| 5,366,035 A | | 11/1994 | Hayashida et al. | |
| 5,467,970 A | | 11/1995 | Ratu et al. | |
| 5,711,544 A | | 1/1998 | Buhl | |
| 5,857,687 A | | 1/1999 | Ishii | |
| 6,109,630 A | * | 8/2000 | Dazy et al. | 280/124.11 |

(Continued)

FOREIGN PATENT DOCUMENTS

DE 765682 6/1953

(Continued)

*Primary Examiner* — Paul N Dickson
*Assistant Examiner* — Karen A Beck
(74) *Attorney, Agent, or Firm* — Ulmer & Berne LLP

(57) ABSTRACT

A suspension assembly includes an axle and a resilient member. The axle includes a first end and a second end and is movable with respect to a vehicle's frame between an unloaded position and a loaded position. The resilient member is configured to be spaced from at least one of the axle and the frame when the axle is in the unloaded position. The resilient member is also configured to selectively progressively bias the axle towards the unloaded position. A vehicle including a suspension assembly is also provided.

23 Claims, 6 Drawing Sheets

U.S. PATENT DOCUMENTS

| | | | |
|---|---|---|---|
| 6,254,072 B1 * | 7/2001 | Bono et al. | 267/220 |
| 6,270,282 B1 | 8/2001 | McLaughlin | |
| 6,312,006 B1 * | 11/2001 | Svensson | 280/683 |
| 6,439,588 B1 * | 8/2002 | Svensson | 280/124.116 |
| 6,478,102 B1 | 11/2002 | Puterbaugh et al. | |
| 6,485,008 B1 | 11/2002 | Griffin | |
| 6,511,084 B1 | 1/2003 | Buhl et al. | |
| 6,533,299 B2 | 3/2003 | Platner | |
| 6,725,957 B2 | 4/2004 | Sutton | |
| 6,736,381 B2 | 5/2004 | Chesne | |
| 6,814,175 B2 * | 11/2004 | Leen | 180/349 |
| 6,871,864 B2 | 3/2005 | Reineck | |
| 6,938,908 B2 | 9/2005 | Oda et al. | |
| 6,959,935 B2 | 11/2005 | Buhl et al. | |
| 7,530,585 B2 * | 5/2009 | Lee | 280/124.116 |
| 2002/0109326 A1 | 8/2002 | Timoney et al. | |
| 2003/0137091 A1 | 7/2003 | Chesne | |
| 2005/0156397 A1 | 7/2005 | Vilardell | |
| 2005/0206111 A1 | 9/2005 | Gibson et al. | |
| 2006/0082038 A1 | 4/2006 | Al-Dahhan et al. | |
| 2007/0145705 A1 * | 6/2007 | Ramsey et al. | 280/124.128 |
| 2007/0164493 A1 * | 7/2007 | McLaughlin et al. | 267/278 |
| 2008/0224436 A1 * | 9/2008 | MacIsaac | 280/124.103 |
| 2009/0174167 A1 * | 7/2009 | Bowers | 280/124.116 |
| 2009/0178875 A1 * | 7/2009 | Bowers | 180/359 |

FOREIGN PATENT DOCUMENTS

| | | |
|---|---|---|
| DE | 1202654 | 10/1965 |
| EP | 1557302 A2 | 7/2005 |
| EP | 1557302 A3 | 3/2006 |
| ES | 1063085 | 10/2006 |

* cited by examiner

US 7,934,579 B2

SUSPENSION ASSEMBLIES HAVING RESILIENT MEMBER AND VEHICLES INCLUDING SAME

TECHNICAL FIELD

A resilient member can be provided on a vehicle to progressively bias an axle away from a vehicle frame. In one embodiment, the resilient member can comprise a bump stop.

BACKGROUND

Conventional light utility vehicles ("LUVs") can be provided with a wheel suspension assembly which is set either to provide good ride comfort in an unloaded condition (e.g., when the LUV has a low payload capacity, and is not expected to frequently carry loads), or to provide good ride quality in a loaded condition (e.g., when the LUV includes stiff springs to allow for higher payload capacity, and is expected to frequently carry heavy loads). To provide good ride comfort in an unloaded condition of an LUV, the suspension can be "softly sprung" such that it can be easily compressed by even small loads. When an LUV with a softly-sprung suspension is loaded, the suspension can be fully compressed and often cannot provide good ride comfort when the left and right wheels of the LUV encounter staggered bumps which accordingly cause the body of an LUV to rock sideways.

SUMMARY

In accordance with one embodiment, a suspension assembly comprises an axle, a first cushion, a second cushion, and a resilient member. The axle comprises a first end and a second end and is movable with respect to a frame of a vehicle between an unloaded position and a loaded position. The first cushion is associated with the first end of the axle. The second cushion is associated with the second end of the axle. The resilient member is disposed laterally between the first cushion and the second cushion. The resilient member is configured for coupling with one of the axle and a frame of a vehicle and is also configured to be spaced from at least one of the axle and a frame of a vehicle when the axle is in the unloaded position. In addition, the resilient member is configured to selectively progressively bias the axle towards the unloaded position.

In accordance with another embodiment, a vehicle comprises a frame, an axle, and a resilient member. The axle is supported by the frame and comprises a first end and a second end. The axle is movable with respect to the frame between an unloaded position and a loaded position. The resilient member is disposed between the frame and the axle and is spaced from at least one of the axle and the frame when the axle is in the unloaded position. The axle and the frame each respectively contact the resilient member when the axle is in the loaded position and the resilient member is configured to selectively progressively bias the axle away from the frame.

In accordance with yet another embodiment, a vehicle comprises a frame, an axle, a first cushion, a second cushion, and a resilient member. The axle is supported by the frame, comprises a first end and a second end, and is movable with respect to the frame between an unloaded position and a loaded position. The first cushion is supported by the frame and is associated with the first end of the axle. The second cushion is supported by the frame and is associated with the second end of the axle. The resilient member is coupled with one of the axle and the frame. The resilient member is spaced from at least one of the axle and the frame when the axle is in the unloaded position. The axle and the frame each respectively contact the resilient member when the axle is in the loaded position and the resilient member is configured to selectively progressively bias the axle away from the frame.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
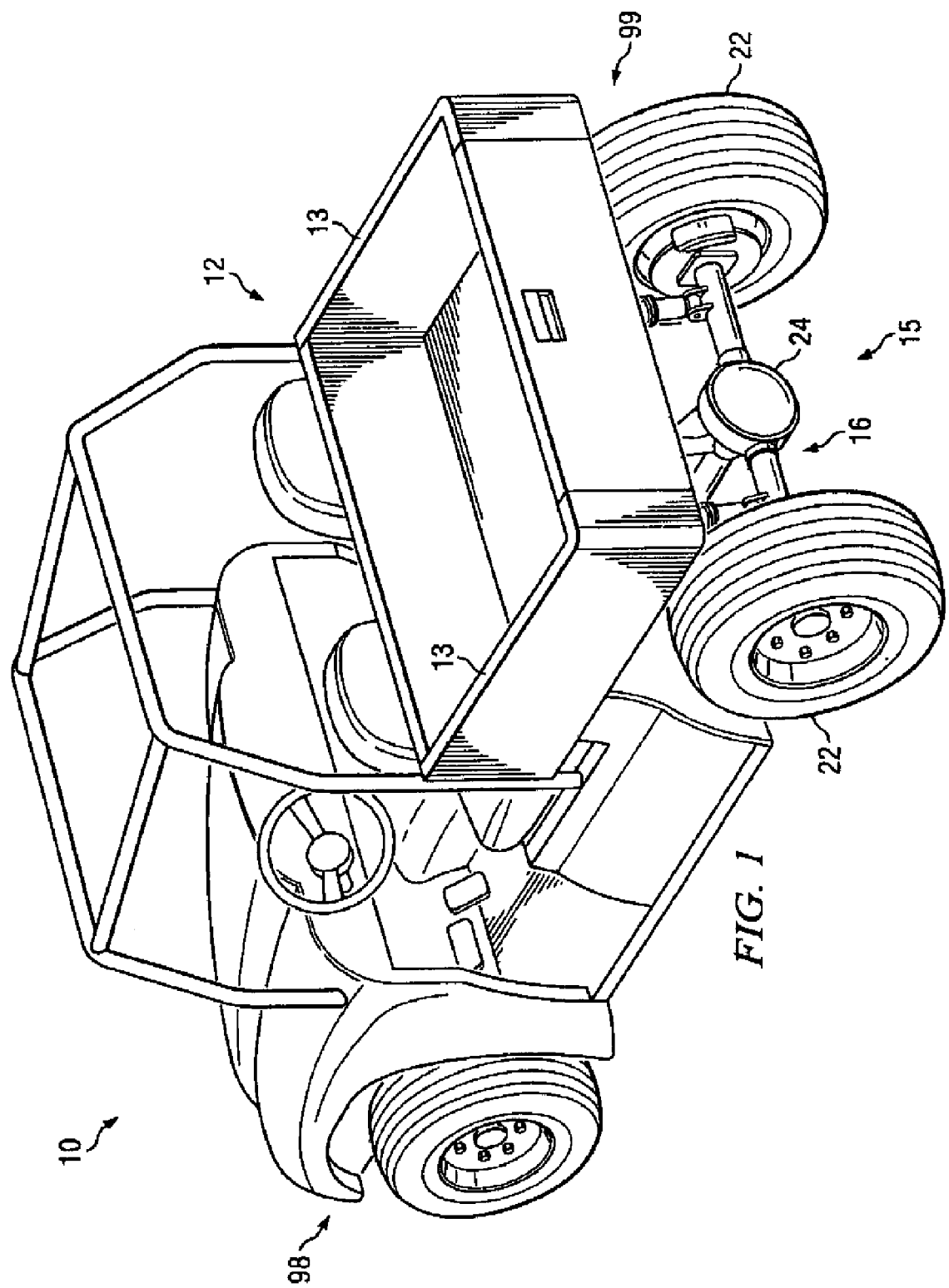
FIG. 1 is an elevated rear perspective view depicting an LUV in accordance with one embodiment.

The present invention and its operation are hereinafter described in detail in connection with the views and examples of FIGS. 1-7, wherein like numbers indicate the same or corresponding elements throughout the views. A vehicle can include a suspension assembly for supporting one or more wheels with respect to a frame of the vehicle. Such a vehicle can comprise, for example, an automobile, a truck, a van, a recreational vehicle, an all terrain vehicle, a utility vehicle, an aircraft, agricultural equipment, construction equipment, a toy, or a mower. In one embodiment, as shown in FIG. 1, the vehicle comprises a utility vehicle ("UTV") such as an LUV 10. Though the LUV 10 is shown to be of a type having four wheels (e.g., 22), it will be appreciated that an LUV or other vehicle can alternatively include more than four wheels or less than four wheels.

The LUV 10 can include and extend between front and rear ends 98, 99, as shown in FIG. 1. The LUV 10 can also include a frame (14 in FIG. 2) which can extend between the front end 98 and the rear end 99 of the LUV 10. The frame 14 can comprise rails, stamped sheet metal components, or a combination thereof, for example. In one embodiment, the LUV 10 can comprise a bed 12 supported by the frame 14. The bed 12 can facilitate support of cargo for transportation by the LUV 10. Although the bed 12 is shown in FIGS. 1-2 and 4-6 to include sides 13 to facilitate support of loose cargo (e.g., dirt), it will be appreciated that the bed 12 can be configured in any of a variety of suitable alternative arrangements (e.g., as a flat bed) for carrying cargo. It will also be appreciated that, in lieu of a bed, an LUV may include a cargo rack, a pump unit, a digging implement, a towing platform, a crane, or any of a variety of other implements.

As illustrated in FIGS. 1-6, the LUV 10 can include a suspension assembly 15. The suspension assembly 15 is shown in FIGS. 1-2 and 4-6 to support the wheels 22 with respect to the frame 14 of the LUV 10. In one embodiment, as shown in FIGS. 1-2 and 4-6, the suspension assembly 15 and wheels 22 can be disposed at a location generally beneath the bed 12 of the LUV 10. Although the suspension assembly 15 is shown to support rear wheels (i.e., 22) with respect to the frame 14 of the LUV 10, it will be appreciated that suspension assemblies in accordance with alternative embodiments might be provided to support front wheels with respect to the frame of a vehicle.

Figure 2:
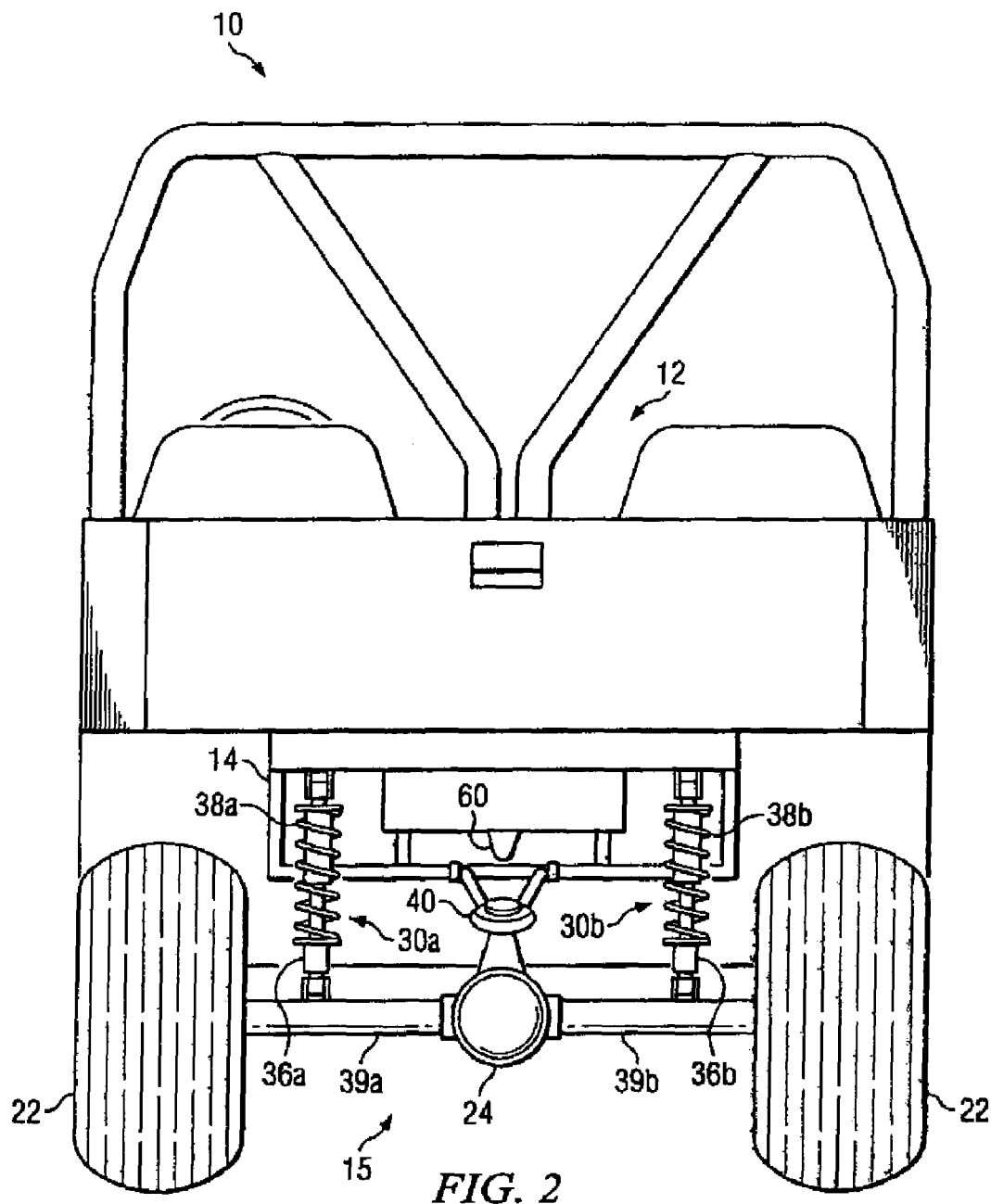
FIG. 2 is a rear elevational view depicting the LUV of FIG. 1, wherein a suspension assembly is shown to be in an unloaded position.
Figure 3:
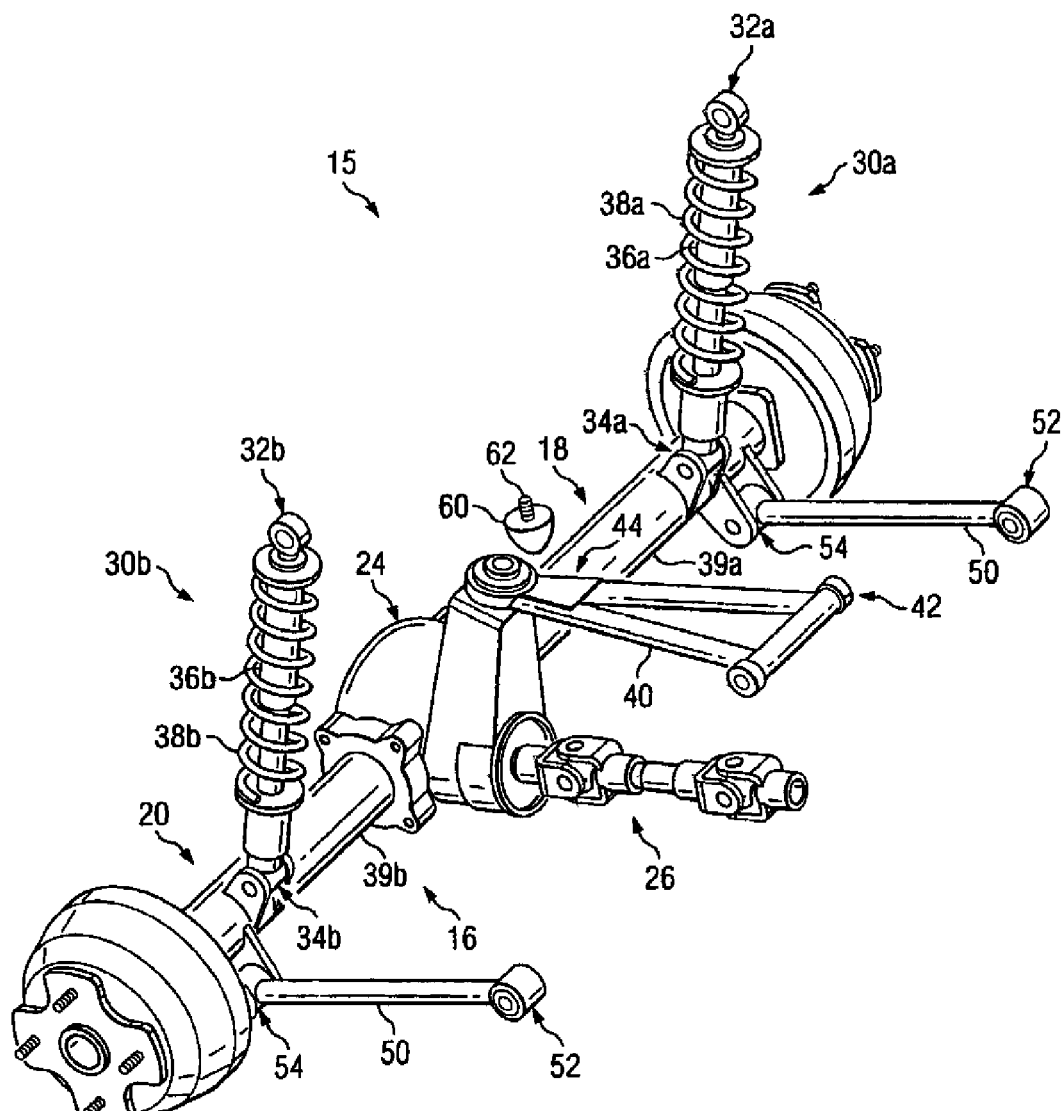
FIG. 3 is a perspective view depicting the suspension assembly of FIG. 2 apart from the remaining components of the LUV of FIG. 2, which have been removed for clarity of illustration.

The suspension assembly 15 is shown to include an axle 16 including and extending between first and second ends 18, 20, as shown in FIG. 3. Wheels (e.g., 22 shown in FIGS. 1-2 and 4-6) can be respectively attached to the first and second ends 18, 20 of the axle 16. In one embodiment, as illustrated in FIG. 3, the axle 16 can comprise a differential 24 for engagement with a driveshaft 26. In such an embodiment, an engine can be coupled with the driveshaft 26 such that operation of the engine correspondingly drives the wheels (e.g., 22) to propel the LUV 10. It will be appreciated that such an engine can comprise, for example, an internal combustion engine, a hydraulic motor, and/or an electric motor. In an alternative embodiment, in lieu of the differential, an axle can include a sprocket for engagement with a belt or chain which is, in turn, coupled with an engine. It will be appreciated that an axle can be coupled with an engine in any of a variety of alternative configurations. In still another alternative embodiment, a suspension assembly might be provided for an axle which is not configured to be driven by an engine (i.e., a "dead axle").

The suspension assembly 15 can comprise a pair of cushions. In one embodiment, as shown in FIGS. 1-6, the cushions can comprise shock absorber assemblies 30a and 30b. The shock absorber assemblies 30a, 30b can each extend between respective first ends 32a and 32b and second ends 34a and 34b. Each of the respective shock absorber assemblies 30a, 30b can include a shock absorber 36a, 36b extending within a coil spring 38a, 38b. In one embodiment, the coil springs 38a, 38b can be tuned to facilitate good ride comfort when the LUV 10 is unloaded. In another embodiment, each of the respective shock absorber assemblies 30a, 30b can also incorporate a stop element (not shown) located near the end of its respective stroke and which is configured to be compressed by other portions of the shock absorber assembly as the shock absorber assembly reaches full compression. Although each of the shock absorbers 36a, 36b is shown in FIG. 3 to comprise a hydraulic fluid-type (e.g., oil, gas) shock absorber, it will be appreciated that a shock absorber can be provided in any of a variety of other suitable configurations which may involve, for example, a tuned mass damper, a leaf spring, a linear electromagnetic motor, or the like.

The cushions can be respectively associated with the first end 18 and the second end 20 of the axle 16. In one embodiment, as illustrated in FIGS. 1-2 and 4-6, the first ends 32a, 32b of the shock absorber assemblies 30a, 30b can be pivotally attached to the frame 14 of the LUV 10. The second end 34a of shock absorber assembly 30a can be pivotally attached to a portion of the axle 16 (e.g., axle tube 39a) disposed adjacent to the first end 18 of the axle 16. Similarly, the second end 34b of shock absorber assembly 30b can be pivotally attached to a portion of the axle 16 (e.g., axle tube 39b) disposed adjacent to the second end 20 of the axle 16. In alternative embodiments, it will be appreciated that cushions can be associated with respective ends of an axle in any of a variety of other suitable configurations or arrangements.

While the shock absorber assemblies 30a, 30b are shown in FIGS. 1-2 and 4-6 to at least partially support the axle 16 with respect to the frame 14, it will be appreciated that the axle 16 can be further supported with respect to the frame 14 through use of one or more additional components. For example, the axle 16 is shown in FIG. 3 to comprise an A-arm 40 which includes a first end 42 and a second end 44. In such an embodiment, the first end 42 of the A-arm 40 can be pivotally attached to the frame 14 and the second end 44 of the A-arm 40 can be pivotally attached (e.g., by a tie rod end or ball joint) to the differential 24. In addition, the suspension assembly 15 can further comprise a pair of links 50 as illustrated in FIG. 3. Each link 50 is shown to include and extend between respective first and second ends 52, 54. In such an embodiment, the first ends 52 of the links 50 can be pivotally attached to the frame 14 and the second ends 54 of the links 50 can be pivotally attached to the axle 16 (e.g., to axle tubes 39a, 39b).

Figure 5:
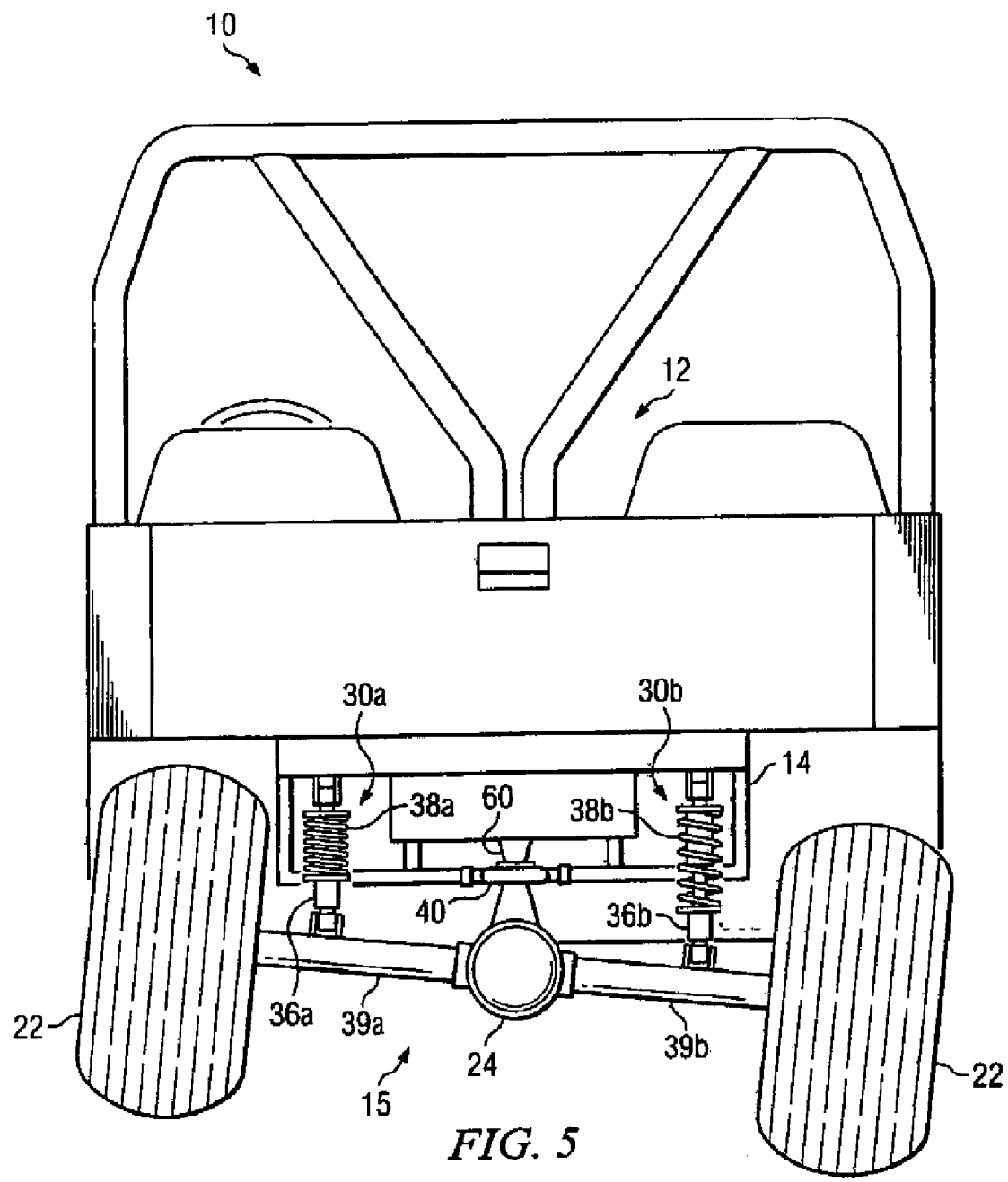
FIG. 5 is a rear elevational view depicting the LUV of FIG. 2, wherein a suspension assembly is shown to be in a loaded position and to encounter staggered terrain.
Figure 6:
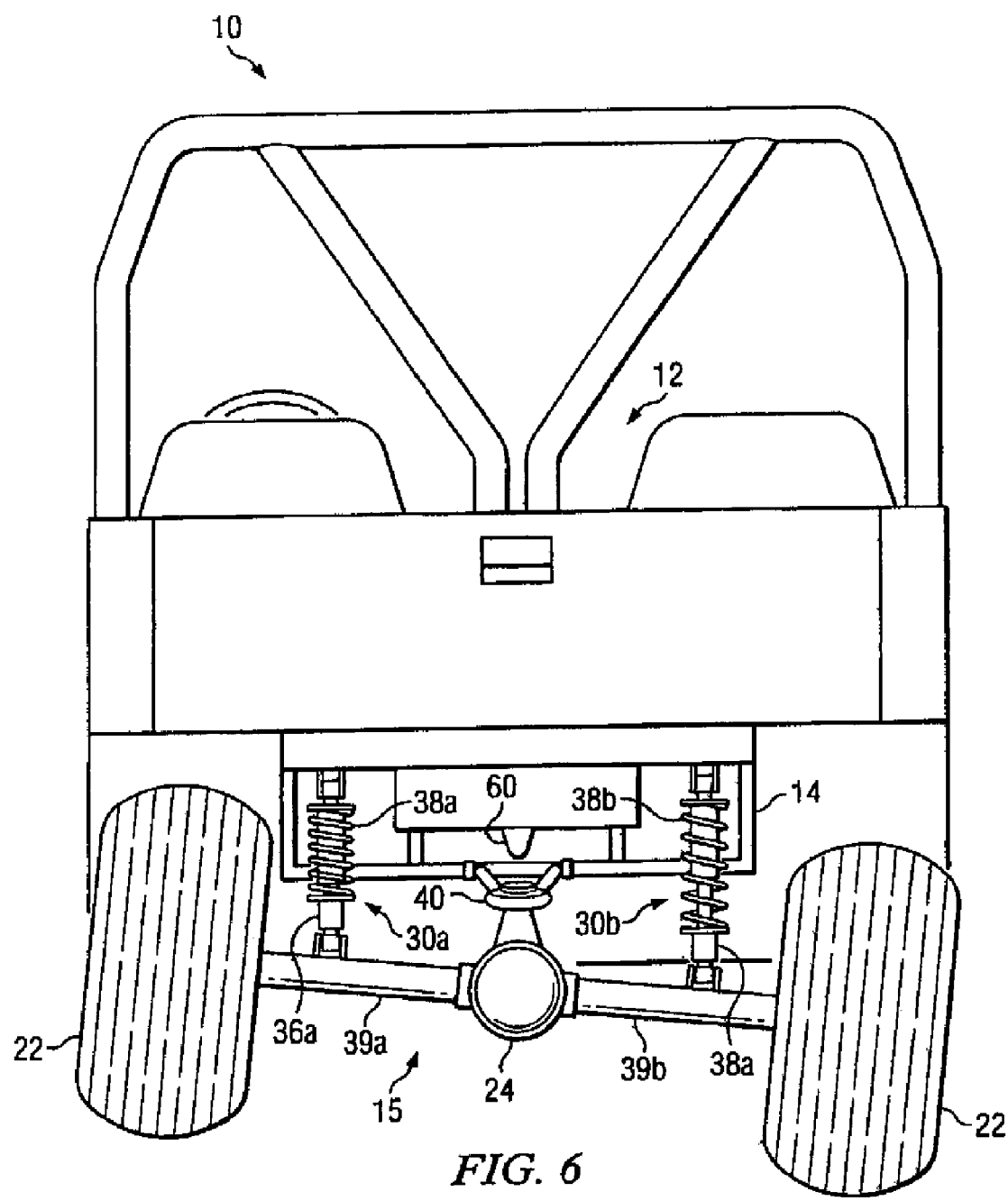
FIG. 6 is a rear elevational view depicting the LUV of FIG. 4, wherein a suspension assembly is shown to be in an unloaded position and to encounter staggered terrain.
Figure 7:
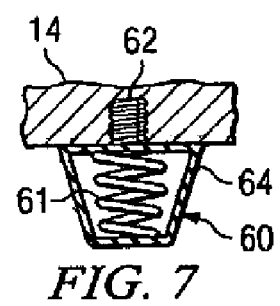
FIG. 7 is an enlarged perspective view depicting a portion of the LUV of FIG. 1.

The suspension assembly 15 can further comprise a resilient member. The resilient member can comprise a bump stop 60, as shown in FIGS. 1-7. The bump stop 60 is shown to be disposed between the axle 16 and the frame 14 and can be coupled with one of the axle 16 and the frame 14. In the embodiment of FIGS. 1-7, the bump stop 60 is shown to be configured to be coupled directly with the frame 14 of the LUV 10. However, it will be appreciated that a bump stop might alternatively be coupled indirectly with a frame (e.g., via a bracket or other component), or might be coupled directly or indirectly with an axle (e.g., to the A-arm 40 and/or the differential 24). While the bump stop 60 is shown in FIGS. 3 and 7 to be configured for coupling with the frame 14 through use of a bolt 62, it will be appreciated that a bump stop or other resilient member can be configured for coupling with a frame or an axle in any of a variety of other suitable arrangements (e.g., welded attachment, adhesive attachment, magnetic attachment, interference fit, or integral formation).

It will be appreciated that the resilient member can be disposed at or near a centerline of a vehicle, and about midway between a first cushion and a second cushion. For example, in the example of FIGS. 1-6, the bump stop 60 is shown to be positioned at or near the centerline of the LUV 10 (i.e., approximately midway between the left and right sides of the LUV 10, and approximately midway between the left and right wheels 22). The bump stop 60 is also shown to be disposed about midway between the first and second shock assemblies 30a, 30b. However, it will be appreciated that a resilient member can be provided in any of a variety of alternative locations upon a vehicle.

The resilient member can be configured to progressively resist compression. For example, as shown in FIG. 7, the bump stop 60 can include a spring portion 61 and a shroud portion 64. Though the spring portion 61 is shown to comprise a coil spring, it will be appreciated that a spring portion can alternatively comprise a leaf spring and/or any of a variety of other spring elements. The spring portion 61 can be formed from metal or from some other suitable material, and the shroud portion 64 can be formed from an elastomeric material (e.g., rubber) or from some other material having resilient properties. The shroud portion 64 can serve to prevent access to the spring portion 61 by dirt, debris, and/or moisture, but might also cooperate with the spring portion 61 to progressively resist compression of the bump stop 60. It will be appreciated that, as the spring portion 61 and the shroud portion 64 are further compressed, the spring portion 61 and the shroud portion 64 can increasingly resist further compression. Though the bump stop 60 is shown to comprise a spring portion 61 and a shroud portion 64, it will be appreciated that a bump stop might alternatively have any of a variety of other suitable arrangements. For example, one alternative bump stop might include a spring portion, but might not include a shroud portion. As another example, a bump stop might include a shroud portion, but might not include a spring portion. Though a shroud portion can define a hollow interior cavity (as shown in FIG. 7), it will be appreciated that a shroud portion can alternatively be formed as a solid block of material (e.g., rubber). It will accordingly be appreciated that a resilient member can be provided to have any of a variety of suitable shapes and configurations.

It will be appreciated that the axle 16 can be movable with respect to the frame 14. This movement may result from loading of the bed 12 with cargo, and/or from the LUV 10 encountering uneven terrain (e.g., a sudden increase or decrease in road height). By facilitating movement of the axle 16 with respect to the frame 14 as the LUV 10 encounters uneven terrain, it will be appreciated that the suspension assembly 15 can prevent transmission of shocks and/or vibrations to the frame 14 resulting from such movement, and can accordingly facilitate enhanced comfort for an operator of the LUV 10. FIGS. 2 and 4-6 provide examples of various operations of the suspension assembly 15.

Figure 4:
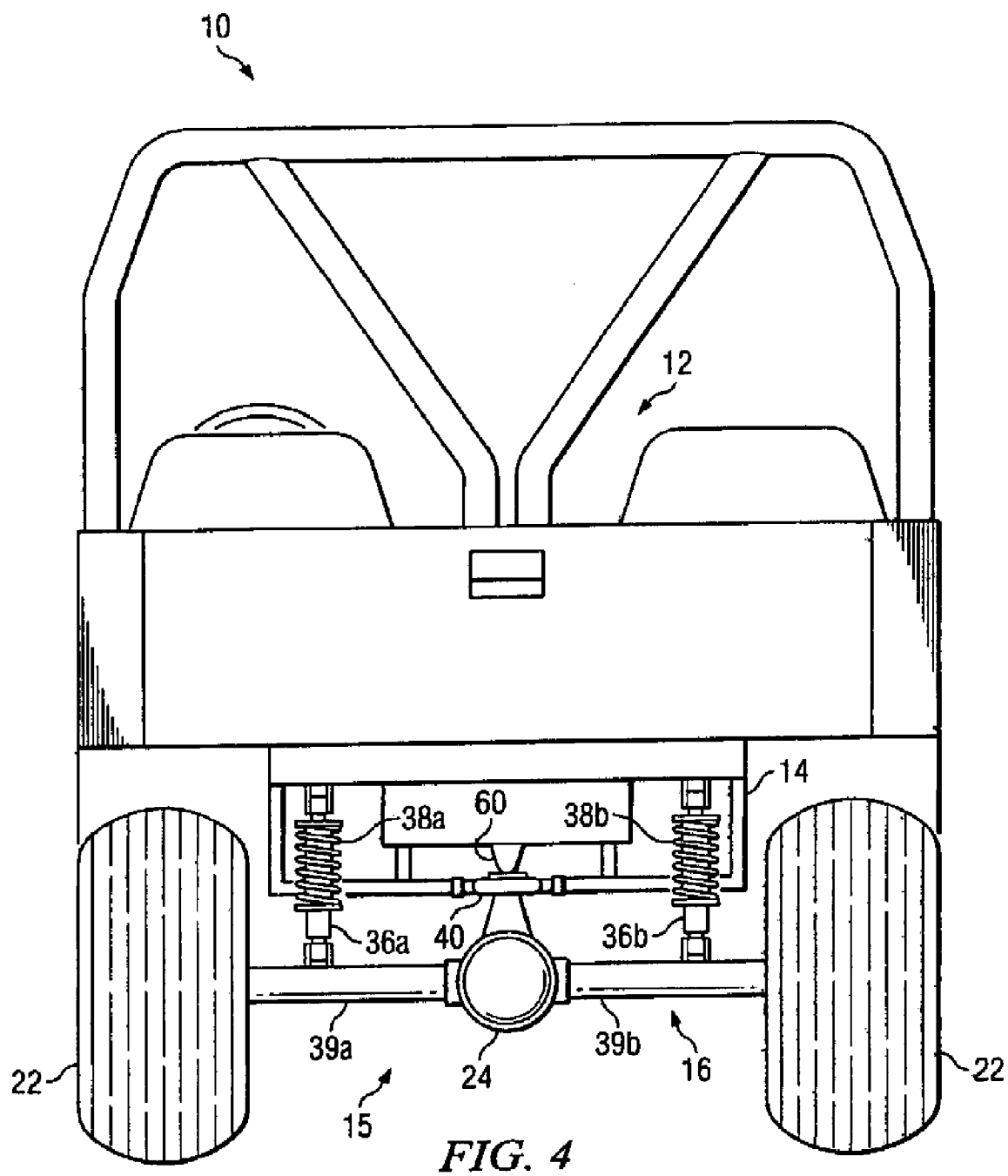
FIG. 4 is a rear elevational view depicting the LUV of FIG. 1, wherein a suspension assembly is shown to be in a loaded position.

For example, FIG. 2 depicts the axle 16 in an unloaded position with respect to the frame 14 such as when the LUV 10 is stationary on a smooth road surface, or when moving and encountering a sudden reduction in road height. FIG. 4 depicts the axle 16 in a loaded position with respect to the frame 14 which can result, for example, from placement of heavy objects within the bed 12 of the LUV 10 and/or by simultaneous travel of both wheels 22 of the LUV over raised terrain (e.g., a speed bump or other sudden increase in road height). FIG. 5 depicts the axle 16 in a loaded position with respect to the frame 14 of the LUV 10 wherein the respective wheels 22 are staggered with respect to one another such as may occur when the LUV 10 traverses uneven terrain. FIG. 6 depicts the LUV 10 under the same circumstances as described with respect to FIG. 5, except that the axle 16 is shown to be in an unloaded position with respect to the frame 14.

When the axle of a suspension assembly is in an unloaded position, the resilient member can be spaced from at least one of the axle and the frame. For example, as shown in FIGS. 2 and 6, the axle 16 is shown to be in an unloaded position, and the bump stop 60 is shown not to contact the axle 16. However, when the axle 16 is in a loaded position, as shown in FIGS. 4 and 5, the bump stop 60 can contact each of the frame 14 and the A-arm 40 of the axle 16. Once the bump stop 60 contacts each of the frame 14 and the axle 16, as the axle 16 is urged further into the loaded position (i.e., closer to the frame 14 and the bed 12), the resilient member 60 can be compressed between the axle 16 and the frame 14. Although the bump stop 60 is shown to selectively contact the A-arm 40 (e.g., when the axle 16 is in a loaded position, but not when the axle 16 is in an unloaded position), it will be appreciated that a resilient member might additionally or alternatively selectively contact another portion of an axle such as, for example, a differential (e.g., 24). It will also be appreciated that a resilient member might be configured to contact one or more other portions of a suspension assembly in any of a variety of suitable arrangements.

The bump stop 60 can exhibit progressive characteristics such that it can provide increasing resistance to further compression as the bump stop 60 is increasingly compressed. When provided upon the LUV 10 as shown in FIGS. 1-7, the bump stop 60 can accordingly be arranged to selectively progressively bias the axle 16 away from the frame 14 and towards an unloaded position. Therefore, when the axle 16 is in a loaded position and thus contacts the bump stop 60, as depicted in FIGS. 4 and 5, the bump stop 60 can resist additional movement of the axle 16 towards the frame 14. It will be appreciated that by progressively biasing the axle 16 away from the frame 14, the bump stop 60 can dampen such movement and can thereby minimize the possibility that an operator of the LUV 10 will experience any sharp impact resulting from this movement of the axle 16 with respect to the frame 14. The shock absorber assemblies 30a, 30b can be selected and tuned to provide a damping force which can assist in controlling the manner in which the axle 16, once compressed in a loaded position with respect to the frame 14, returns to an unloaded position under force from the bump stop 60.

It will be appreciated that the cushions can cooperate with the resilient member to minimize transmission of shocks and vibration resulting from an uneven road surface to an operator. For example, in the embodiment illustrated in FIGS. 1-6, the shock absorber assemblies 30a and 30b can facilitate extension of the axle 16 away from the frame 14 such that the wheels 22 maintain contact with the roadway, despite sudden variation in road height. The shock absorber assemblies 30a and 30b can also cooperate with the bump stop 60 to dampen movement of the axle 16 towards the frame 14 as the axle 16 moves into a loaded position. Stop elements (not shown, and discussed above) optionally incorporated into respective shock absorber assemblies 30a, 30b can be tuned to work in conjunction with the bump stop 60 for controlling movement of an axle with respect to the frame of a vehicle.

Conventional suspension systems can employ bulky, "long travel" shock absorber assemblies. Such shock absorber assemblies can minimize contact between an axle and a vehicle's frame by maintaining space between the axle and the frame when the axle is in a loaded position. To provide good ride comfort when a vehicle is unloaded or only lightly loaded with cargo, the conventional suspension can be "softly sprung" such that it can be easily compressed by even small loads. When an LUV with a conventional softly-sprung suspension is loaded, the suspension can be fully compressed and often cannot provide good ride comfort when the left and right wheels of the LUV encounter staggered bumps which accordingly cause the body of the LUV to rock sideways.

However, by providing a resilient member (e.g., bump stop 60) in cooperation with the cushions (e.g., shock absorber assemblies 30a, 30b) as shown, for example, in FIGS. 1-7, it will be appreciated that a compact suspension assembly can be achieved and can facilitate a more comfortable ride for an operator of an LUV regardless of the payload and terrain encountered by the LUV. In particular, a resilient member (e.g., bump stop 60) can be employed to facilitate dampened contact between the axle and the frame such that less bulky shock absorber assemblies (e.g., including "short travel" shock absorbers) can be used. In addition to being cost effective and easy to install, short travel shock absorbers can yield additional clearance to install a utility bed at a lower height with respect to the ground surface than could be achieved through use of a conventional suspension system having long travel shock absorbers.

When the axle 16 is in a loaded position and the LUV 10 encounters even terrain, the bump stop 60 can be contacted and compressed against the frame 14 by the axle 16, as shown in FIG. 4. When the axle 16 remains in the loaded position and encounters uneven terrain, the axle 16 can pivot on the bump stop 60 such as, for example, as shown in FIG. 5. By allowing the axle 16 to pivot on the bump stop 60, as shown in FIG. 5, the body of the LUV 10 can be prevented from correspondingly rocking as a result of the uneven terrain, and it will be appreciated that an operator of the LUV 10 might not experience uncomfortable impacts or vibration even when the LUV 10 is fully loaded with cargo.

With reference to FIGS. 1-7, it can be seen that the LUV 10 provides limited space for rear suspension components due to the relatively low height of the bed 12. In particular, only a limited area is provided in which the cushions and resilient member(s) can reside. Despite these space limitations, the suspension assembly 15 of the LUV 10 can provide good ride comfort for an operator regardless of whether the LUV 10 is loaded with cargo, and regardless of whether the terrain encountered by the LUV 10 is staggered. The suspension assembly 15 therefore facilitates use of a utility bed (e.g., bed 12) having a relatively low height and without sacrificing comfort of an operator. It will be appreciated that, regardless of whether the terrain is even or staggered, the resilient member (e.g., the bump stop 60) can prevent the wheels 22 from contacting the bed 12 when the axle 16 is in a loaded position. In particular, through use of short travel shock absorbers (e.g., 36a, 36b), and by allowing the axle 16 to pivot on the bump stop 60, the components of the suspension assembly 15 need not move into space occupied by the bed 12, though one wheel 22 at any given time can travel a similar amount (e.g., 100 mm) to that provided for by certain conventional suspension systems including long travel shock absorbers. In one embodiment, the bed of a vehicle can be provided with wheel wells to facilitate even further travel of the vehicle's wheels, and/or the bed can be sized to fit laterally between the wheels.

The suspension assembly 15 can additionally provide good ride comfort when the LUV 10 is unloaded or only lightly loaded with cargo and moves over small bumps (see FIG. 2) or encounters staggered terrain (see FIG. 6), much like provided for by certain conventional suspension systems including long travel shock absorbers. While the LUV 10 is unloaded or only lightly loaded with cargo, and is negotiating a turn, the shock absorber assemblies 30a, 30b can provide sufficient force to resist body roll. The suspension assembly 15 can also provide good ride comfort when the LUV 10 is heavily loaded with cargo and moves over small bumps (see FIG. 4) or encounters staggered terrain (see FIG. 5). If significantly staggered terrain is encountered by the LUV 10 when heavily loaded with cargo, the axle 16 can rock while resting on the bump stop 60 to facilitate reduction of the impact of the staggered terrain upon the body of the LUV 10, and thus to the operator. Even when the LUV 10 is heavily loaded with cargo, the compliance of the wheels 22 and of the bump stop 60 can provide reasonable ride comfort for an operator of the LUV 10.

For example, due to the low height of the bed 12, movement of the axle 16 with respect to the bed 12 can be limited. As shown in FIGS. 5-6, when one wheel 22 is closest to the bed 12 (e.g., at maximum bump stroke which can be 100 mm above the full rebound stroke), the other wheel 22 can be furthest from the bed (e.g., at full rebound stroke). The cushions (e.g., shock absorber assemblies 30a, 30b) can limit the total stroke of each respective wheel (e.g., to 100 mm). Movement of the axle 16 toward the frame 14 is shown to be limited by the bump stop 60. The bump stop 60 can be tuned to have a very progressive spring rate so that the suspension assembly 15 does not exhibit a noticeable bump when the bump stop 60 is first contacted, and is then compressed, by the axle 16. In order to limit movement of the axle 16 with respect to the frame 14 (e.g., to 50 mm), the bump stop 60 can contact the axle 16 well before the axle 16 reaches its maximum travel distance (e.g., 50 mm).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A suspension assembly comprising:
   an axle comprising a first end and a second end, the axle being movable with respect to a frame of a vehicle between an unloaded position and a loaded position;
   a first cushion associated with the first end of the axle;
   a second cushion associated with the second end of the axle; and
   a resilient member disposed laterally between the first cushion and the second cushion, the resilient member being configured for coupling with one of the axle and a frame of a vehicle and being configured to be spaced from at least one of the axle and a frame of a vehicle when the axle is in the unloaded position; wherein
   the resilient member is configured to selectively progressively bias the axle towards the unloaded position;
   the resilient member is disposed about midway between the first cushion and the second cushion; and
   the resilient member is configured for coupling with a frame of a vehicle, the axle is spaced from the resilient member when the axle is in the unloaded position, and the axle contacts the resilient member when the axle is in the loaded position.

2. The suspension assembly according to claim 1 wherein the resilient member comprises an elastomeric material.

3. The suspension assembly according to claim 1 wherein the resilient member comprises a spring.

4. The suspension assembly according to claim 1 wherein the axle is operable to pivot on the resilient member when the axle is in the loaded position.

5. The suspension assembly according to claim 1 wherein the first cushion and the second cushion comprise respective shock assemblies.

6. A vehicle comprising:
   a frame;
   an axle supported by the frame, the axle comprising a first end and a second end and being movable with respect to the frame between an unloaded position and a loaded position;
   a resilient member disposed between the frame and the axle; and
   a first cushion supported by the frame and associated with the first end of the axle and a second cushion supported by the frame and associated with the second end of the axle; wherein
   the resilient member is spaced from at least one of the axle and the frame when the axle is in the unloaded position, the axle and the frame each respectively contact the resilient member when the axle is in the loaded position, and the resilient member is configured to selectively progressively bias the axle away from the frame; and
   the resilient member is disposed about midway between the first cushion and the second cushion.

7. The vehicle according to claim 6 wherein the resilient member comprises a spring.

8. The vehicle according to claim 6 wherein the resilient member comprises an elastomeric material.

9. The vehicle according to claim 6 wherein the resilient member is coupled with the frame and the resilient member is spaced from the axle when the axle is in the unloaded position.

10. The vehicle according to claim 6 wherein the axle is operable to pivot on the resilient member when the axle is in the loaded position.

11. The vehicle according to claim 10 wherein the first cushion and the second cushion comprise respective shock assemblies.

12. The vehicle according to claim 6 further comprising a front end and a rear end, wherein the frame extends between the front end and the rear end and the axle is supported adjacent to the rear end.

13. A vehicle comprising:
a left side and a right side;
a frame;
an axle supported by the frame, the axle comprising a first end and a second end and being movable with respect to the frame between an unloaded position and a loaded position; and
a resilient member disposed between the frame and the axle, the resilient member being disposed approximately midway between the left side and the right side; wherein
the resilient member is spaced from at least one of the axle and the frame when the axle is in the unloaded position, the axle and the frame each respectively contact the resilient member when the axle is in the loaded position, and the resilient member is configured to selectively progressively bias the axle away from the frame; and
the axle comprises an A-arm pivotally attached to the frame and configured to contact the resilient member when the axle is in the loaded position.

14. The vehicle according to claim 6 further comprising a pair of wheels respectively attached to the first end and the second end of the axle.

15. The vehicle according to claim 14 further comprising a bed supported by the frame and spaced from the axle such that the resilient member prevents the pair of wheels from contacting the bed when the axle is in the loaded position.

16. The vehicle according to claim 13 wherein the resilient member is coupled with the frame and the resilient member is spaced from the axle when the axle is in the unloaded position.

17. The vehicle according to claim 13 further comprising:
a pair of wheels respectively attached to the first end and the second end of the axle; and
a bed supported by the frame and spaced apart from the axle such that the resilient member prevents the pair of wheels from contacting the bed when the axle is in the loaded position.

18. A vehicle comprising:
a frame;
an axle supported by the frame, the axle comprising a first end and a second end and being movable with respect to the frame between an unloaded position and a loaded position;
a first cushion supported by the frame and associated with the first end of the axle;
a second cushion supported by the frame and associated with the second end of the axle; and
a resilient member coupled with one of the axle and the frame; wherein
the resilient member is spaced from at least one of the axle and the frame when the axle is in the unloaded position, the axle and the frame each respectively contact the resilient member when the axle is in the loaded position, and the resilient member is configured to selectively progressively bias the axle away from the frame; and
the resilient member is disposed about midway between the first cushion and the second cushion.

19. The vehicle according to claim 18 wherein the resilient member comprises at least one of a spring and an elastomeric material.

20. The vehicle according to claim 18, the vehicle further comprising a front end and a rear end, wherein the frame extends between the front end and the rear end and the axle is supported adjacent the rear end.

21. A vehicle comprising:
a left side and a right side;
a frame;
an axle supported by the frame, the axle comprising a first end and a second end and being movable with respect to the frame between an unloaded position and a loaded position;
a first cushion supported by the frame and associated with the first end of the axle;
a second cushion supported by the frame and associated with the second end of the axle; and
a resilient member coupled with one of the axle and the frame, the resilient member being disposed approximately midway between the left side and the right side; wherein
the resilient member is spaced from at least one of the axle and the frame when the axle is in the unloaded position, the axle and the frame each respectively contact the resilient member when the axle is in the loaded position, and the resilient member is configured to selectively progressively bias the axle away from the frame; and
the axle further comprises an A-arm pivotally attached to the frame and configured to contact the resilient member when the axle is in the loaded position.

22. The vehicle according to claim 21 wherein the resilient member is coupled with the frame and the resilient member is spaced from the axle when the axle is in the unloaded position.

23. The vehicle according to claim 21 further comprising:
a pair of wheels respectively attached to the first end and the second end of the axle; and
a bed supported by the frame and spaced apart from the axle such that the resilient member prevents the pair of wheels from contacting the bed when the axle is in the loaded position.

* * * * *